(12) United States Patent
Dodwell et al.

(10) Patent No.: US 7,966,724 B2
(45) Date of Patent: Jun. 28, 2011

(54) CONDUIT ASSEMBLY METHODS

(75) Inventors: David Dodwell, Long Beach, CA (US); George Yard, Whittier, CA (US)

(73) Assignee: Nelson-Dunn, Inc., Cerritos, CA (US)

( * ) Notice: Subject to any disclaimer, the term of this patent is extended or adjusted under 35 U.S.C. 154(b) by 653 days.

(21) Appl. No.: 11/270,180

(22) Filed: Nov. 9, 2005

(65) Prior Publication Data

US 2007/0102845 A1    May 10, 2007

(51) Int. Cl.
*H01R 43/00* (2006.01)
*H02G 3/18* (2006.01)

(52) U.S. Cl. .............................. 29/858; 29/857; 174/650

(58) Field of Classification Search .................... 29/858, 29/857, 862, 863, 864, 865; 174/650
See application file for complete search history.

(56) References Cited

U.S. PATENT DOCUMENTS

| | | | | |
|---|---|---|---|---|
| 3,554,444 A * | 1/1971 | Hochman | ........................ | 239/8 |
| 3,763,367 A * | 10/1973 | Nitsch et al. | ................... | 362/548 |
| 3,796,449 A * | 3/1974 | McLaughlin et al. | ......... | 285/405 |
| 4,504,112 A * | 3/1985 | Gould et al. | ................... | 385/102 |
| 5,195,788 A * | 3/1993 | Oetiker | ........................ | 285/252 |
| 5,286,068 A * | 2/1994 | Wiebe | .......................... | 285/114 |
| 5,620,208 A * | 4/1997 | Kirkham | ....................... | 285/21.1 |
| 5,620,209 A * | 4/1997 | Sauer | ............................. | 285/23 |
| 5,932,332 A * | 8/1999 | Pandorf et al. | ................ | 428/220 |
| 6,418,712 B2 * | 7/2002 | Darley | ............................ | 60/283 |
| 6,634,034 B2 * | 10/2003 | Rendell | .......................... | 4/252.4 |
| 6,858,804 B2 * | 2/2005 | Murakami et al. | .......... | 174/84 R |
| 6,883,187 B2 * | 4/2005 | Cornwall | ........................ | 4/252.5 |
| 6,889,948 B2 * | 5/2005 | Melancon et al. | ......... | 248/309.1 |
| 7,003,869 B2 * | 2/2006 | Lutzen et al. | ................... | 29/751 |
| 7,049,518 B2 * | 5/2006 | Kimura et al. | .............. | 174/74 R |
| 7,054,529 B2 * | 5/2006 | Bonicel | ......................... | 385/100 |
| 7,134,696 B2 * | 11/2006 | Poll | ............................... | 285/256 |
| 7,140,914 B2 * | 11/2006 | Kojima | ......................... | 439/585 |
| 7,232,955 B1 * | 6/2007 | Shadel et al. | ............... | 174/74 R |
| 7,271,340 B2 * | 9/2007 | Buck et al. | ................... | 174/75 C |
| 7,350,291 B2 * | 4/2008 | Ortiz Negron et al. | ......... | 29/828 |

OTHER PUBLICATIONS

Drawing illustrating a composite conduit assembly that was sold in the United States before Nov. 9, 2004.

* cited by examiner

*Primary Examiner* — A. Dexter Tugbang
*Assistant Examiner* — David P Angwin
(74) *Attorney, Agent, or Firm* — Knobbe Martens Olson & Bear, LLP

(57) ABSTRACT

A method of assembling a conduit assembly can include seating a ferrule on a distal end portion of an elongate conduit body. The method can further include providing an elongate body insert having a large diameter end an a small diameter end, wherein the elongate body insert defines a hollow tubular body having a passage along a symmetrical axis between the large and small diameter ends. The method can further include mounting the end portion of the elongate conduit body on the small diameter end of the body insert, such that the large diameter end of the body insert contacts an end of the ferrule interposed axially between the large diameter end of the body insert and the distal end of the elongate conduit body, the distal end of the elongate conduit body axially adjacent the end of the ferrule to prevent axial contact between the distal end of the elongate conduit body and the large diameter end of the body insert. The method can further include compressing the elongate conduit body between the body insert and the ferrule, deploying a transmission line into the elongate conduit body wherein the transmission line comprises at least one of a hydraulic hose and an electrical cable, and pouring potting material into the elongate conduit body.

9 Claims, 8 Drawing Sheets

CONDUIT ASSEMBLY METHODS

FIELD OF THE INVENTION

The present invention relates generally to the manufacture of conduit assemblies, and relates more specifically to methods for producing composite conduit assemblies capable of housing electrical cables and/or hydraulic hoses.

BACKGROUND OF THE INVENTION

A wide variety of cables and hoses are used to transmit electrical and hydraulic power from one location to another. While separate, specifically-designed cables and hoses are often used to separately transmit electrical and hydraulic power, this arrangement often becomes cumbersome when many cables are used. Therefore, composite conduit assemblies have been developed that are configured to house electrical cables and hydraulic hoses in a single conduit. Such composite conduit assemblies are used in a wide variety of applications where electrical and hydraulic power is to be transmitted from one location to another. For example, composite conduit assemblies are often used to provide electrical and hydraulic power to the drilling and pipe handling equipment that is commonly used in the oil industry.

BRIEF SUMMARY OF THE INVENTION

Methods for fabricating composite conduit assemblies capable of housing electrical cables and/or hydraulic hoses are described herein. In certain optional embodiments, the methods disclosed herein are capable of producing a composite conduit assembly that has sufficient durability to withstand harsh environmental and operating conditions, while still retaining sufficient flexibility to accommodate the repetitive and cyclical movements associated with drilling and pipe handling equipment.

According to one embodiment of the present invention, a method of assembling a conduit assembly comprises positioning a ferrule over an end portion of an elongate conduit body. The method further comprises positioning a body insert into the end portion of the elongate conduit body. The end portion of the elongate conduit body is positioned between the ferrule and the body insert. The method further comprises expanding a portion of the body insert positioned inside the elongate conduit. The method further comprises positioning an elongate cable in the elongate conduit body. The elongate cable is longer than the elongate conduit body. The method further comprises filling at least a portion of the elongate conduit body with a potting material.

According to another embodiment of the present invention, a method of assembling a conduit assembly comprises providing an elongate conduit body having a first end and a second end opposite the first end. At least one of the first and second ends has an end fitting fixed thereto. The method further comprises deploying a string through the elongate conduit body. The method further comprises coupling a cord to the string. The method further comprises deploying the cord through the elongate conduit body by removing the string from the elongate body. The method further comprises coupling a wench cable to the cord. The method further comprises deploying the wench cable through the elongate conduit body by removing the cord from the elongate body. The method further comprises coupling a transmission line to the wench cable. The transmission line comprises a hydraulic hose and/or an electrical cable. The transmission line is longer than the elongate conduit body. The method further comprises deploying the transmission line through the elongate conduit body by removing the wench cable from the elongate body.

According to another embodiment of the present invention, a method comprises seating a ferrule on an end portion of an elongate conduit body. The method further comprises providing an elongate body insert having a large diameter end and a small diameter end. The method further comprises mounting the end portion of the elongate conduit body on the small diameter end of the body insert, such that the large diameter end of the body insert contacts the ferrule. The method further comprises compressing the elongate conduit body between the body insert and the ferrule. The method further comprises deploying a transmission line into the elongate conduit body. The transmission line comprises at least one of a hydraulic hose and an electrical cable. The method further comprises pouring a potting material into the elongate conduit body.

BRIEF DESCRIPTION OF THE DRAWINGS

Example embodiments of the methods for constructing composite conduit assemblies are illustrated in the accompanying drawings, which are for illustrative purposes only. The drawings comprise the following figures, in which like numerals indicate like parts.

DETAILED DESCRIPTION OF THE INVENTION

Disclosed herein are techniques for fabricating composite conduit assemblies capable of housing electrical cables and/or hydraulic hoses. The assembly techniques disclosed herein are usable to produce composite conduit assemblies ranging from less than a meter in length to over 100 meters in length. In certain embodiments, these composite conduit assemblies have sufficient durability to withstand harsh environmental and operating conductions while still retaining sufficient flexibility to accommodate repetitive and cyclical bending movements, such as those associated with drilling and pipe handling equipment.

Figure 1:
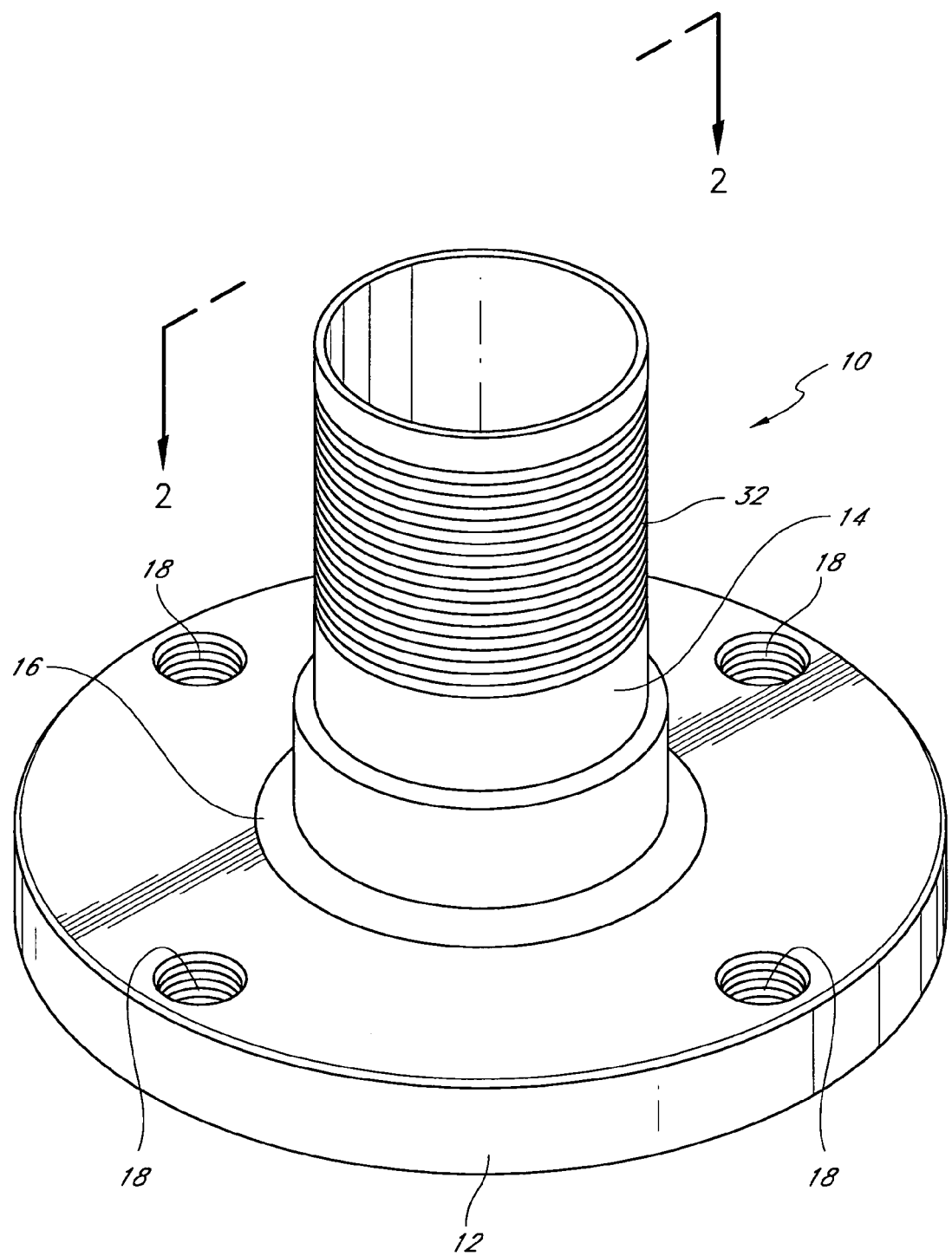
FIG. 1 is a perspective view of an exterior portion of an example partially assembled end fitting.
Figure 2:
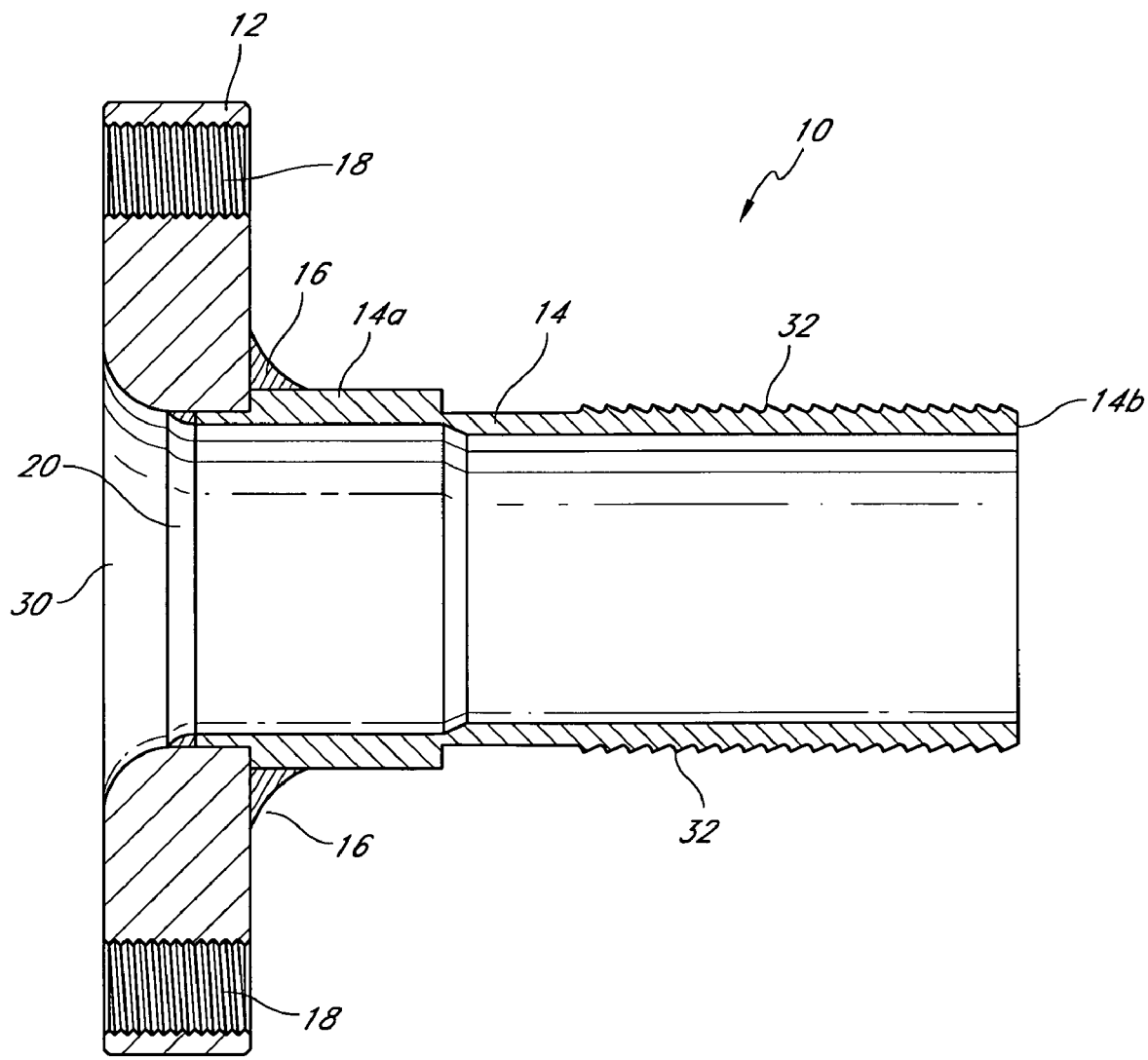
FIG. 2 is a cross-sectional view of the partially assembled end fitting taken along line 2-2.

FIG. 1 is a perspective view of an exterior portion of an example partially assembled end fitting 10 for use with a composite conduit assembly. FIG. 2 is a cross-sectional view of the partially assembled end fitting 10 taken along line 2-2. As illustrated, the end fitting 10 includes a flange 12 joined to a body insert 14 by an exterior weld 16 and an interior weld 20. In certain embodiments, the exterior weld 16 and the interior weld 20 are formed using a tungsten inert gas welding technique, although other welding techniques are used in other embodiments. In such embodiments, a ⅛-inch stainless steel rod is used to form the exterior weld 16, and a 1/16-inch stainless steel rod is used to form the interior weld 20, although other materials and dimensions can be used as well.

Still referring to the example embodiment illustrated in FIGS. 1 and 2, the flange 12 includes a plurality of threaded holes 18, as well as a large, unthreaded central hole 30. In an example embodiment, the flange 12 comprises hot rolled and annealed steel, although other materials are used in other embodiments. The body insert 14 defines a hollow tubular body that is aligned with the central hole 30; the tubular body has a varying inner and outer diameter. Specifically, as illustrated in FIG. 2, the body insert 14 has a larger outer diameter and a larger inner diameter in a first end portion 14a that is adjacent to the flange 12, as compared to a second end portion 14b that is distal to the flange 12. In an example embodiment, the second end portion 14b includes an exterior serrated surface 32. The body insert 14 comprises low carbon steel, although other materials are used in other embodiments. In an example embodiment the central hole 30 and the body insert 14 inner diameter are sized to allow an appropriate quantity of electrical cables and/or hydraulic hoses to be positioned therein, based on the specifications for a particular application.

Figure 3:
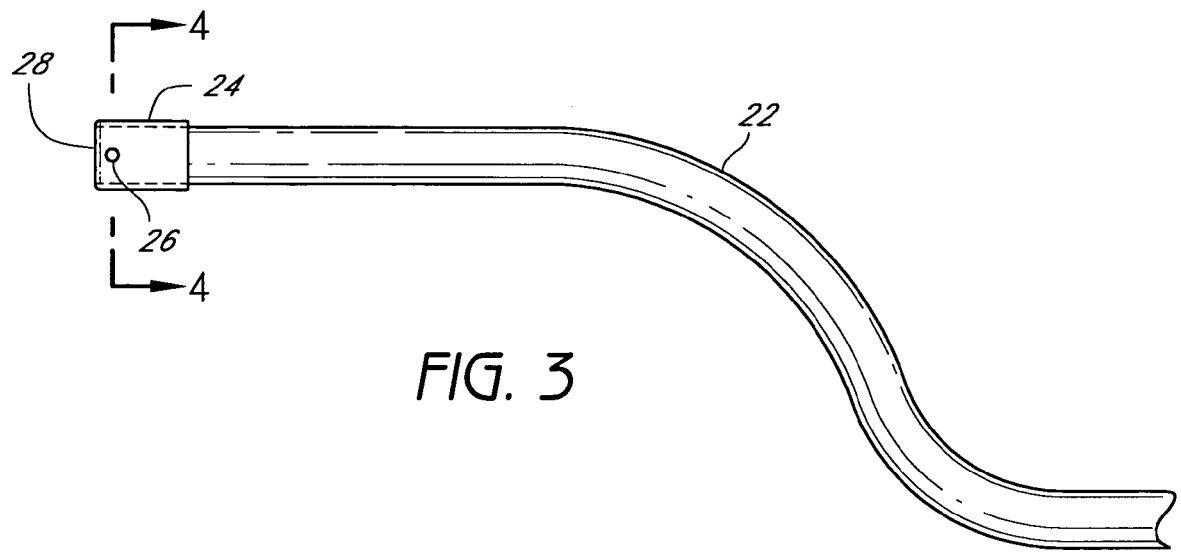
FIG. 3 is a side view of an example elongate conduit body having a ferrule installed over one end.

FIG. 3 illustrates an elongate, tubular conduit body 22 that has been cut to an appropriate length for a particular application. In an example embodiment, the conduit body 22 comprises styrene butadiene rubber. In other embodiments, the conduit body 22 comprises one or more other materials that provide good abrasion resistance, cracking resistance, oil resistance, and tensile strength. In certain embodiments, the conduit body 22 is resistant to degradation when exposed to ozone, water, light, or other environmental conditions. As an example, many synthetic rubber materials provide certain of these qualities, and such materials are used to form the conduit body 22 in certain embodiments. In an example embodiment, the conduit body 22 has an inner diameter that is approximately equal to or slightly larger than an outer diameter of the second end portion 14b of the body insert 14.

Figure 4:
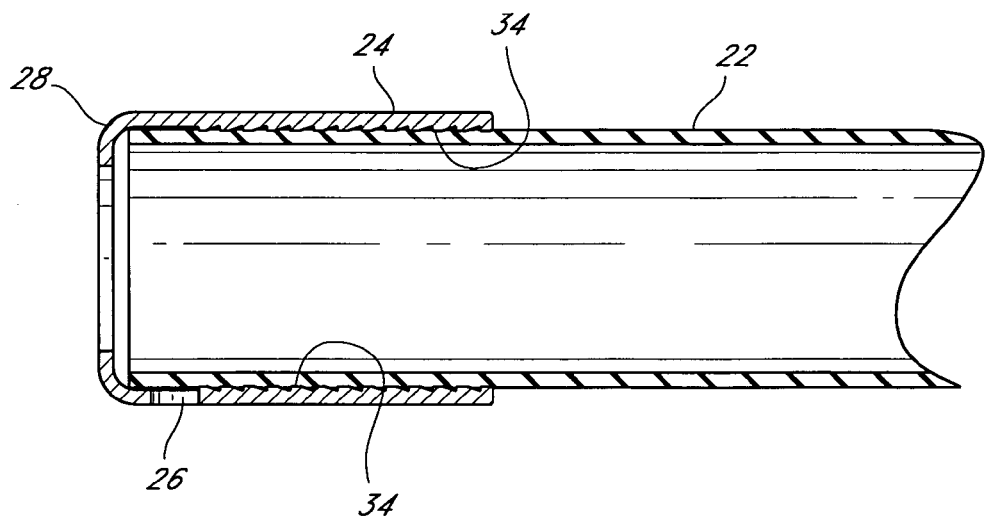
FIG. 4 is a cross-sectional view of the elongate conduit body having the ferrule installed over one end, taken along line 4-4.

Still referring to FIG. 3, a ferrule 24 is installed over an end of the conduit body 22. FIG. 4 is a cross-sectional view of the elongate conduit body 22 having the ferrule 24 installed over one end, taken along line 4-4. As illustrated, the ferrule 24 has an inside diameter that is approximately equal to an outer diameter of the conduit body 22. However, the ferrule 24 also has an end portion 28 having a reduced diameter, thereby allowing the end of the conduit body 22 to seat within the end portion 28 upon insertion into the ferrule 24. In an example embodiment, the ferrule end portion 28 has an inner diameter that is smaller than the body insert first end portion 14a, but that is larger than the body insert second end portion 14b.

The ferrule 24 optionally includes at least one sight hole 26 positioned adjacent to the reduced diameter end portion 28, thereby allowing an assembler to see whether the conduit body 22 has seated in the end portion 28 of the ferrule 24. The ferrule 24 also optionally includes a plurality of teeth 34 on the inner surface thereof, the teeth 34 being configured to grip the conduit body 22. In an example embodiment, the ferrule 24 comprises low carbon steel, although other materials are used in other embodiments.

Figure 5:
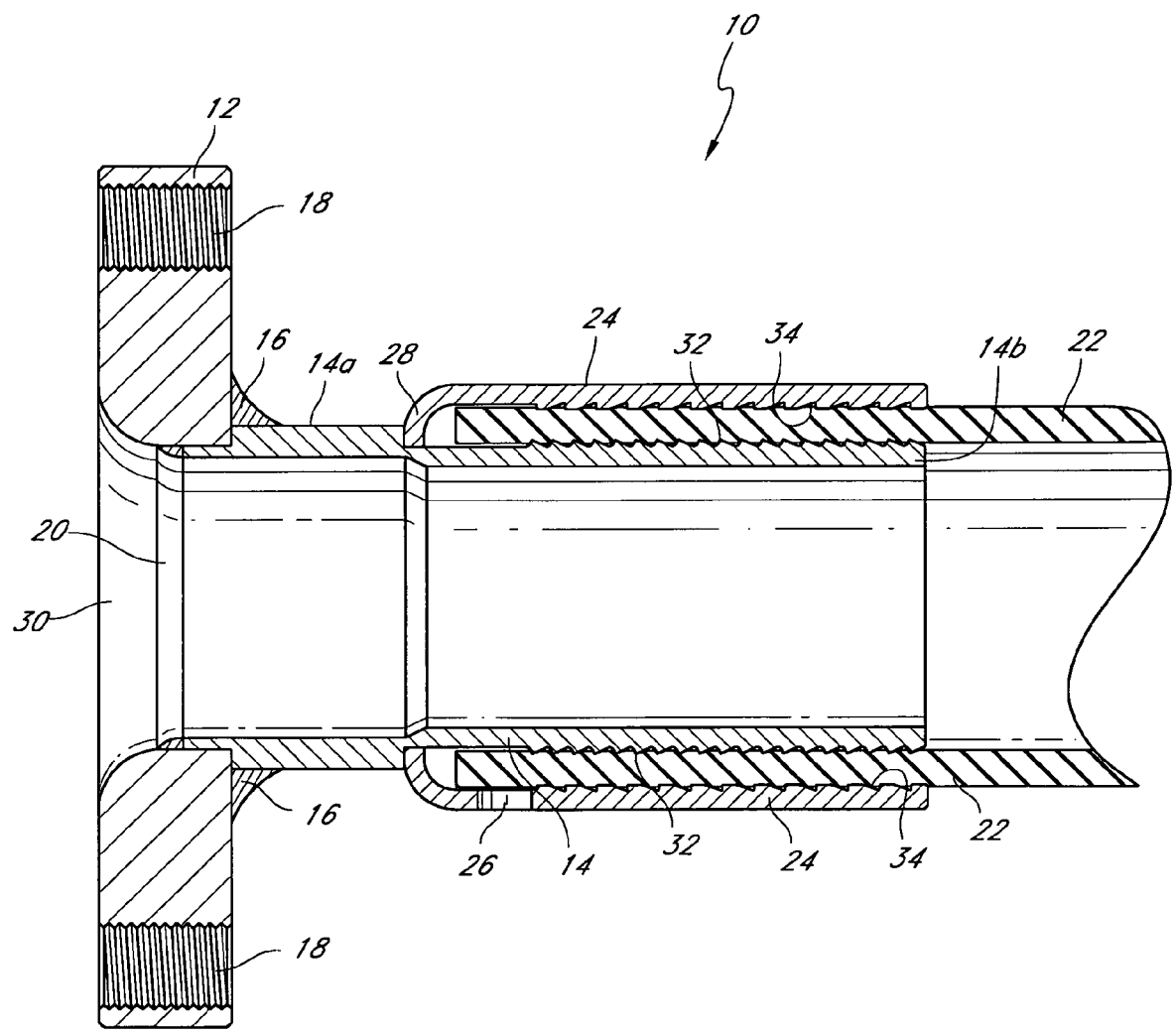
FIG. 5 is a cross-sectional view of the end fitting of FIG. 1 having the conduit body and ferrule of FIG. 3 installed thereon.

Once the ferrule 24 is installed on the end of the conduit body 22, the second end portion 14b of the body insert 14 is inserted through the end portion 28 of the ferrule 24 and into the end of the conduit body 22. The first end portion 14a of the body insert 14 acts as a stop, thus preventing the ferrule 24 from contacting the flange 12. The resulting structure is illustrated in FIG. 5, which shows that the end of the conduit body 22 is positioned between the body insert 14 and the ferrule 24. In embodiments wherein the conduit body 22 is tightly fit over the body insert 14, the body insert 14 is optionally lubricated, for example using an oil, such as a vegetable oil, to assist in the insertion process.

After the conduit body 22 and ferrule 24 are installed onto the body insert 14, the inner diameter of the second end portion 14b of the body insert 14 is internally expanded using, for example, an electric or hydraulic expansion machine and a die. In one embodiment, the inner diameter of the body insert second end portion 14b is expanded such that the body insert 14 has a substantially constant inner diameter from the first end portion 14a to the second end portion 14b.

Expanding the inner diameter of the body insert second end portion 14b causes the outer diameter of the body insert second end portion 14b to expand, thus securely pinching the conduit body 22 between the body insert 14 and the ferrule 24. This also secures the ferrule 24 to the body insert 14 by preventing the reduced diameter end portion 28 from sliding off of the expanded body insert second end portion 14b. Expanding the inner diameter of the body insert second end portion 14b also causes the optional serrated surface 32 and/or optional teeth 34 to be pressed into the conduit body 22, thus further securing the conduit body 22 to both the ferrule 24 and the body insert 14. This results in the flange 12, the body insert 14, the conduit body 22 and the ferrule 24 all being secured together to form a finished end fitting 10. Once the end fittings 10 are formed at one or both ends of the elongate conduit body 22, the electric cables and/or the hydraulic hoses are ready to be deployed within the conduit body.

The electrical cables and/or hydraulic hoses to be positioned within the conduit body 22 are bundled together before they are deployed therein. In an example embodiment, this is accomplished by wrapping tape (for example, 1-inch fiber reinforced adhesive tape) around the cables and/or hoses periodically (for example, every 12 inches). This assists in holding the cables and/or hoses in substantially cylindrical bundle, which facilitates their deployment within the conduit body 22. The process of bundling the cables together is optional; for example, in embodiments wherein only one hose or cable is to be deployed within the conduit body, the bundling procedure is omitted. The cables and/or hoses are optionally wrapped in a plastic sheath before deployment into the conduit body 22. In an example embodiment, the cables and/or hoses are longer than the conduit body 22, such that after deployment therein, a length of cable and/or hose extends from one or both ends of the conduit body 22. This extra length of cable and/or hose is useful, for example, in splicing the cables and/or hoses of the composite conduit assembly to other cables and/or hoses.

Figure 6:
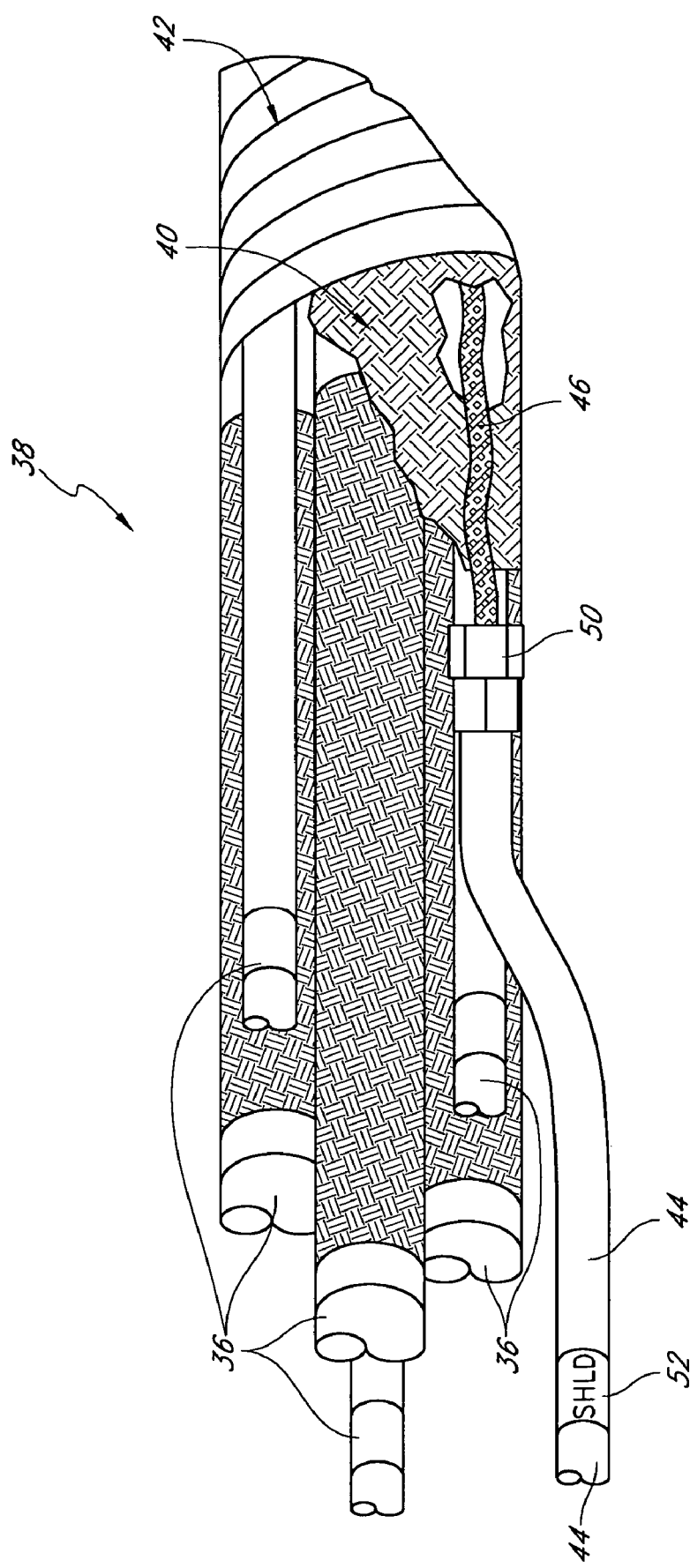
FIG. 6 is a partial cutaway view of an example variable frequency drive cable including a separated insulated grounding cable.

In embodiments wherein the composite conduit assembly includes an electrical cable having conductive shielding, a separate grounding cable coupled from the shielding is optionally formed at one or both ends of the shielded cable. For example, FIG. 6 illustrates a partial cutaway view of a variable frequency drive ("VFD") cable 38 having a plurality of individually insulated electrical conductors 36. The conductors 36 are enclosed in a conductive armor 40 which is surrounded by an insulating wrap 42. In an example embodiment, the conductive armor comprises stainless steel braiding, and the insulating wrap comprises a polymeric material, such as a Mylar®. Other types of VFD cable are used in other embodiments.

When using a VFD cable such as that illustrated in FIG. 6, the conductive armor 40 is configured to be connected to an electrical ground. When the VFD cable is installed within the conduit body 22, this ground connection is provided by a separate grounding cable 44, as illustrated in FIG. 6. The grounding cable 44 provides an electrical connection between the conductive armor 40 and the exterior of the conduit body 22. In an example embodiment, this is accomplished by removing the insulating wrap 42 from one end of the VFD cable 38, and combing out a portion of the conductive armor 40. The individual conductive strands that form the conductive armor 40 are twisted into a plurality of groups, which are then braided into a wire 46, as illustrated in FIG. 6. The wire 46 is coupled into the insulated grounding cable 44 using a soldered bushing 50. The soldered bushing 50 is optionally enclosed within heat shrink tubing. The insulated grounding cable 44 is then grouped with the other electrical conductors 36 from the VFD cable 38.

In an example embodiment, the insulated grounding cable 44 includes a distinctive indicium, such as a marking 52, to differentiate it from the other electrical conductors 36. In a modified embodiment wherein the composite conduit assembly includes a plurality of VFD cables, the grounds for the VFD cables are optionally combined into a single insulated grounding cable. The VFD cable 38 is then ready to be bundled with other cables and/or hoses as described above, and deployed into the composite conduit 22 using the techniques described herein. In an example embodiment, the electrical conductors 38 and the insulated grounding cable 44 extend from one or both ends of the composite conduit.

By optionally positioning the soldered bushing 50 and the stripped portion of the insulating wrap 42 within the conduit body 22, only the electrical conductors 36 and the insulated grounding cable 44 extend from an end of the composite conduit assembly. This advantageously eliminates the need for an end user to splice the individual components of the VFD cable 38; instead, the splice is secured within the composite conduit assembly. However, in modified embodiments the VFD cable is not spliced inside the composite conduit assembly.

Figure 7:
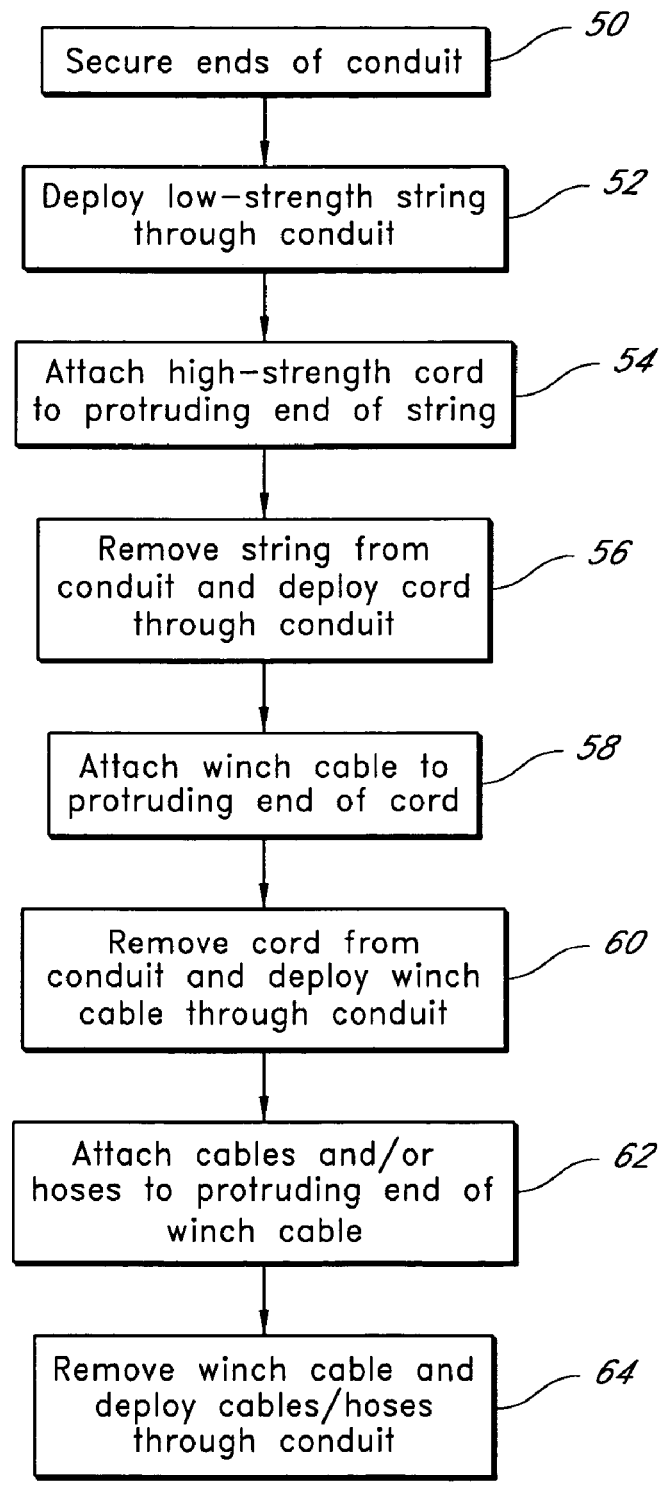
FIG. 7 is a flowchart illustrating selected steps in an example process for deploying bundled hoses and/or cables into a conduit body.

An example process for deploying a hydraulic hose, an electrical cable, or a bundle of hoses and cables into a conduit body 22 is set forth in the flowchart illustrated in FIG. 7. In this process, the ends of the conduit body 22 are securely anchored, as indicated by operational block 50. In example embodiments wherein end fittings 10 have been assembled one the conduit body 22, this is accomplished by pinning the end fittings 10 between the blades of a forklift, by tying cables between the threaded holes 18 and floor anchors, by a combination of these two techniques, or by using other techniques.

Once the ends of the conduit body 22 are secured, a string (for example, a fiber, nylon, metal, or other string type) is deployed through the length of the conduit body 22, as indicated by operational bock 52. Preferably, the string is longer than the conduit body 22, such that the ends of the string extend from the ends of the conduit body 22 when the string is fully deployed. In an example embodiment, the string is deployed by tying one end of a string to a ping-pong ball and blowing the ping-pong ball through the conduit body 22 using compressed air. In this embodiment, string is used (a) to facilitate the passage of the string through the conduit when only compressed air is used as a propellant, and (b) because the string is not subjected to large tensile stresses in subsequent assembly steps. Other techniques are used to deploy the string into the conduit body 22 in other embodiments. For example, in a modified embodiment a first magnet is tied to one end of the string, and a second magnet is passed along the exterior of the conduit body 22, thereby "dragging" the first magnet along the interior of the conduit body 22 as the string is deployed therein. In yet another modified embodiment, ping pong ball is used, but a vacuum is used to pull the ball from one end of the conduit body 22.

Once the string is deployed through the length of the conduit body 22, a cord is attached to a first end of the string, as indicated by operational block 54. In an example embodiment, the cord has a higher tensile strength than the string. A second end of the string is then pulled from the conduit body 22, thereby removing the string from the conduit body 22 and deploying the cord into the conduit body 22, as indicated by operational block 56. Preferably, the cord is longer than the conduit body 22, such that the ends of the cord extend from the ends of the conduit body 22 when the cord is fully deployed.

Once the cord is deployed through the length of the conduit body 22, a winch cable, or other pulling device, is attached to a first end of the cord, as indicated by operational block 58. A second end of the cord is then pulled from the conduit body 22, thereby removing the cord from the conduit body 22 and deploying the winch cable into the conduit body 22, as indicated by operational block 60. In an example embodiment, the cord has sufficient tensile strength to pull the winch cable through the conduit body 22. Preferably, the winch cable is longer than the conduit body 22, such that the ends of the winch cable extend from the conduit body 22 when the winch cable is fully deployed.

Once the winch cable is deployed through the length of the conduit body 22, the bundle of electrical cables and/or hydraulic hoses to be deployed therein is coupled to a first end of the winch cable, as indicated by operational block 62. In an example embodiment, this is accomplished using a bundled cable harness that cinches around the bundled cables and includes a hook that is tied to the winch cable. A winch is then used to pull a second end of the winch cable from the conduit body 22, thereby removing the winch cable from the conduit body 22 and deploying the bundle of electrical cables and/or hydraulic hoses through the conduit body 22.

Figure 8:
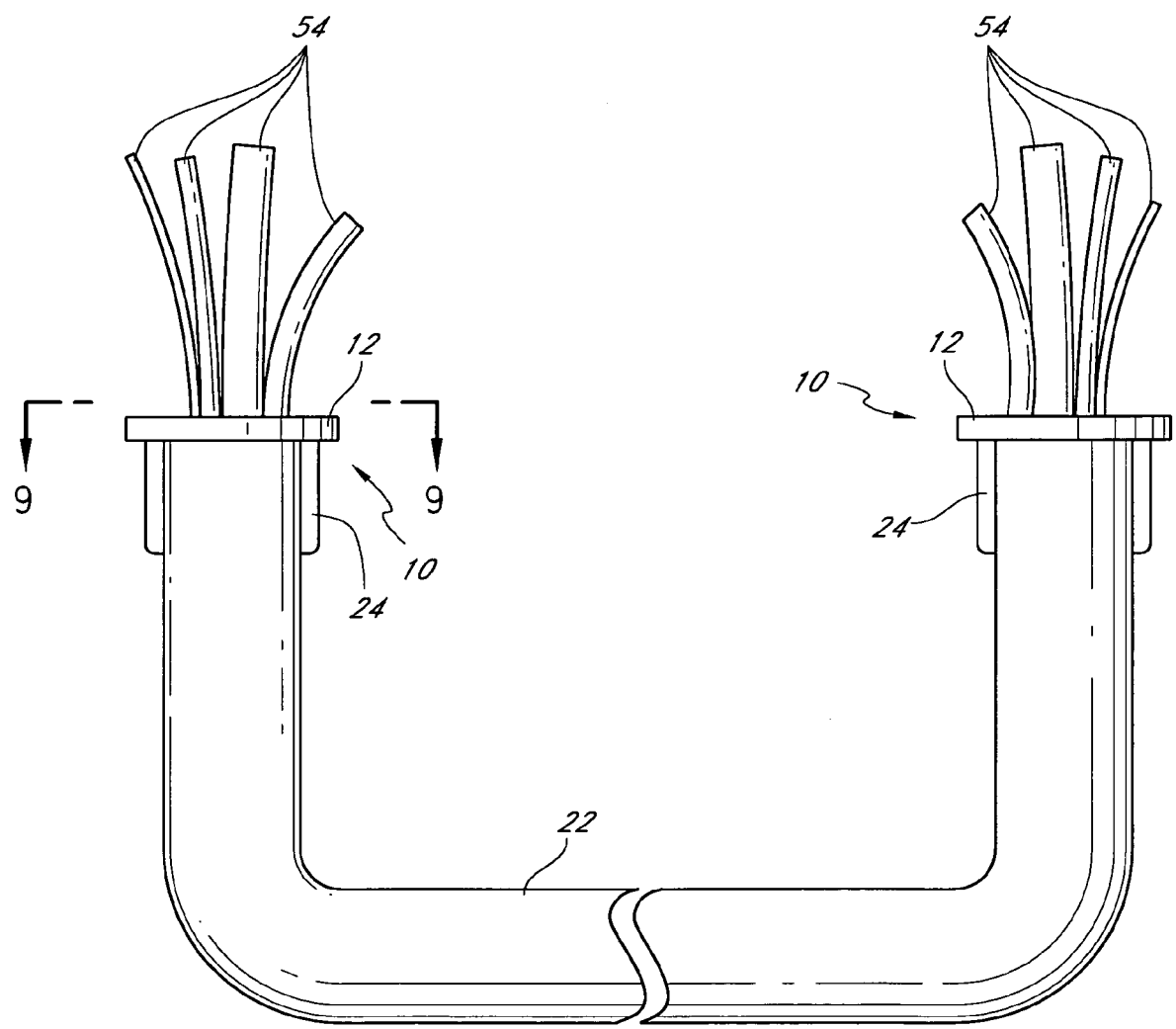
FIG. 8 is a schematic illustration of an example layout for filing a composite conduit assembly with a potting material.
Figure 9:
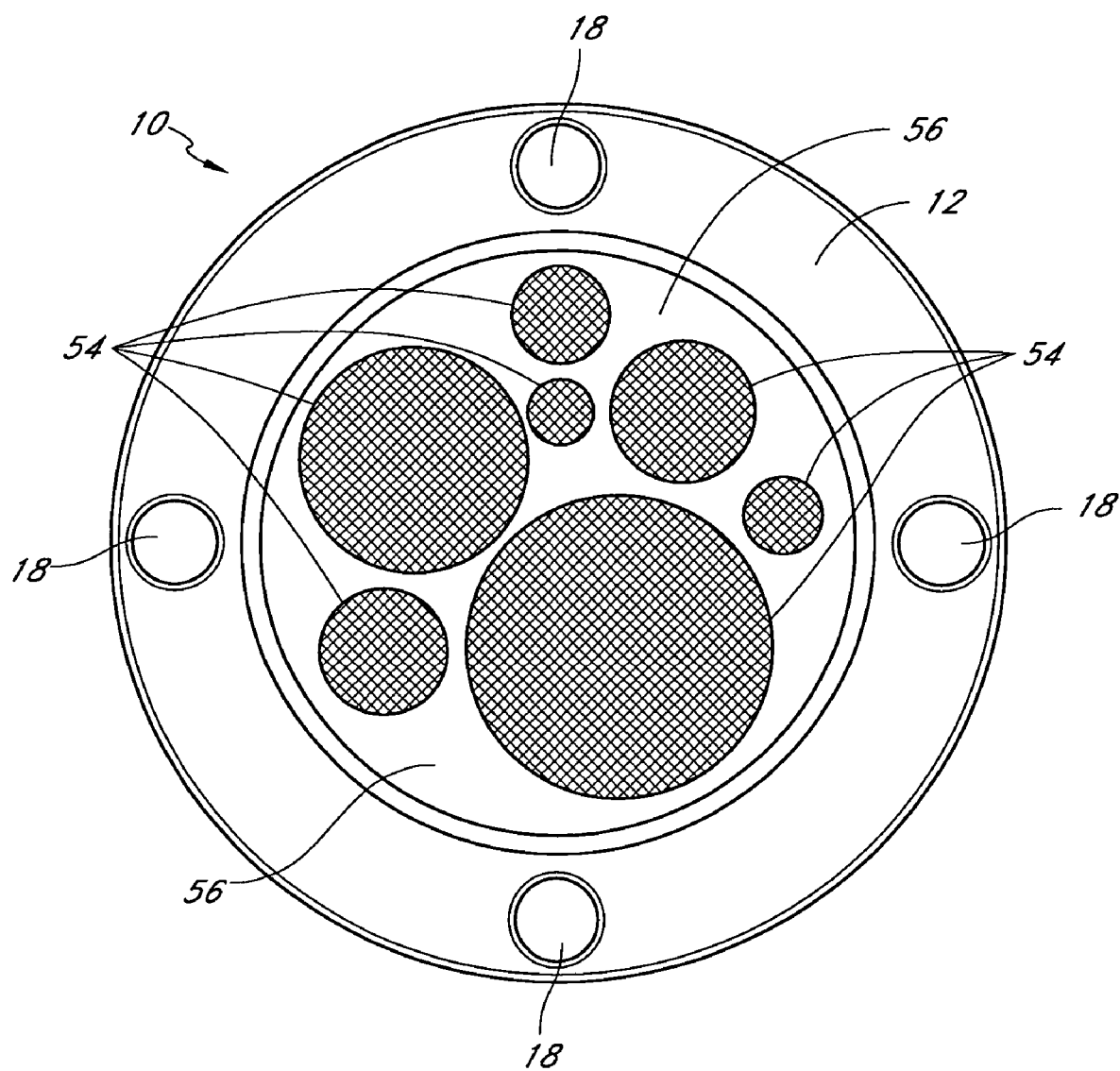
FIG. 9 is a cross-sectional view of the composite conduit assembly of FIG. 8 taken along line 9-9.

Once the bundle of electrical cables and/or hydraulic hoses is deployed into the conduit body 22, a potting material is filled into the conduit body 22. The potting material unites the bundles cables and/or hoses with the conduit body 22, thereby reducing or preventing binding or other movement of the cables and/or hoses within the conduit body 22. In an example embodiment, the potting material is poured into the conduit body 22 using the example gravity-based filling system illustrated in FIG. 8. As illustrated, the conduit body 22 is laid out with the end fittings 10 elevated and facing upward, with the cable and/or hose ends 54 deployed in the conduit body 22 extending therefrom. FIG. 9 is a cross-sectional view of the end fitting 10 illustrated in FIG. 8, taken along line 9-9. Once the conduit body 22 is positioned as illustrated in FIG. 8, a potting material is poured into one or both ends of the conduit body 22. Specifically, the potting material is poured into the portion of the conduit body 22 not occupied by the cables and/or hoses, as indicated by region 56 illustrated in FIG. 9.

In an example embodiment, the potting material comprises two different liquid polymers that, when cured at room temperature between approximately 12 hours and approximately 48 hours, form a relatively tough urethane elastomer that is resistant to petroleum and ozone, and that has superior abrasion resistance. In one embodiment, the potting material retains its mechanical properties over a wide range of operating temperatures, such as between about −20° F. and about +175° F.

In an example embodiment, a first liquid polymer is poured into the conduit body 22 first, and is filled to within approximately three feet (or other desired distance) of the end fittings 10. A second liquid polymer is poured into the conduit body 22 after the first liquid polymer, and is filled to the opening of the end fitting 10. In an example embodiment, the second liquid polymer has more adhesive properties as compared to the first liquid polymer, whereas the first liquid polymer is more flexible than the second liquid polymer. In a modified embodiment wherein the conduit body is relatively short, the first liquid polymer is filled to less than three feet of the end fittings 10. In yet another modified embodiment, the first liquid polymer is omitted, and the conduit body is potted using only the second liquid polymer. In yet another modified embodiment, the second liquid polymer is omitted, and the conduit body is potted using only the first liquid polymer.

The first and second liquid polymers include a catalyst and a base that are mixed before pouring into the conduit body 22. In one embodiment, the first liquid polymer is Calthane 1900 (base and catalyst mixed at a 9:1 mass ratio), and the second liquid polymer is Calthane 1300 (base and catalyst mixed at a 6:1 mass ratio), which are both available from Cal Polymers, Inc. (Long Beach, Calif.).

After the potting material is filled into the conduit body, the resulting structure is allowed to cure for at least approximately 12 hours. Shorter or longer curing times are used in other embodiments. After the potting material has cured, the resulting composite conduit assembly is ready for use. As expounded herein, the techniques disclosed herein are usable to produce composite conduit assemblies having sufficient durability to withstand harsh environmental and operating conductions yet still retain sufficient flexibility to accommodate repetitive and cyclical bending movements, such as those associated with drilling and pipe handling equipment.

SCOPE OF THE INVENTION

While the foregoing detailed description discloses several embodiments of the present invention, it should be understood that this disclosure is illustrative only and is not limiting of the present invention. It should be appreciated that the specific configurations and operations disclosed can differ from those described above, and that the methods described herein can be used in contexts other than the manufacture of composite conduit assemblies.

We claim:

1. A method comprising:
   seating a ferrule on a distal end portion of an elongate conduit body;
   providing an elongate body insert having a large diameter end and a small diameter end, wherein the elongate body insert defines a hollow tubular body having a passage along a symmetrical axis between the large diameter end and the small diameter end;
   mounting the end portion of the elongate conduit body on the small diameter end of the body insert, such that the large diameter end of the body insert contacts an end of the ferrule interposed axially between the large diameter end of the body insert and the distal end of the elongate conduit body, the distal end of the elongate conduit body axially adjacent the end of the ferrule to prevent axial contact between the distal end of the elongate conduit body and the large diameter end of the body insert;
   compressing the elongate conduit body between the body insert and the ferrule;
   deploying a transmission line into the elongate conduit body, wherein the transmission line comprises at least one of a hydraulic hose and an electrical cable; and
   pouring a potting material into the elongate conduit body.

2. The method of claim 1, wherein:
   the elongate conduit body is seated in a reduced diameter portion of the ferrule; and
   the reduced diameter portion of the ferrule is configured to pass over the small diameter end of the elongate body insert, but is configured to not pass over the larger diameter end of the elongate body insert.

3. The method of claim 1, wherein compressing the elongate conduit body further comprises expanding at least a portion of the body insert.

4. The method of claim 1, wherein mounting the elongate conduit body onto the body insert further comprises lubricating the body insert.

5. The method of claim 1, further comprising welding a flange to the large diameter end of the elongate body insert using a tungsten inert gas welding technique.

6. The method of claim 1, wherein the elongate conduit body is seated in a reduced diameter portion of the ferrule.

7. The method of claim 1, wherein:
   the elongate conduit body is seated in a reduced diameter portion of the ferrule; and
   the reduced diameter portion of the ferrule is configured to pass over the small diameter end of the elongate body insert, but is configured to not pass over the larger diameter end of the elongate body insert.

8. The method of claim 1, wherein compressing the elongate conduit body further comprises expanding at least a portion of the body insert.

9. The method of claim 1, wherein mounting the elongate conduit body onto the body insert further comprises lubricating the body insert.

* * * * *

UNITED STATES PATENT AND TRADEMARK OFFICE
CERTIFICATE OF CORRECTION

| | | |
|---|---|---|
| PATENT NO. | : 7,966,724 B2 | Page 1 of 1 |
| APPLICATION NO. | : 11/270180 | |
| DATED | : June 28, 2011 | |
| INVENTOR(S) | : David Dodwell et al. | |

It is certified that error appears in the above-identified patent and that said Letters Patent is hereby corrected as shown below:

Title Page, Item (75) Inventors: should read --David Dodwell, Long Beach, CA (US); George Yard, Whittier, CA (US); Kevin B. Dunn, Yorba Linda, CA (US)--.

Signed and Sealed this
Fourth Day of October, 2011

David J. Kappos
*Director of the United States Patent and Trademark Office*